(No Model.) 2 Sheets—Sheet 1.

S. M. LILLIE.
PROCESS OF AND APPARATUS FOR SEPARATING RAW SUGAR LIQUOR FROM THE SCUM AND MECHANICAL IMPURITIES CONTAINED THEREIN.

No. 294,798. Patented Mar. 11, 1884.

WITNESSES:
Aemilius M Stout
Thomas L Kelly

INVENTOR
S. Morris Lillie

ATTORNEY (No Model.) 2 Sheets—Sheet 2.

S. M. LILLIE.
PROCESS OF AND APPARATUS FOR SEPARATING RAW SUGAR LIQUOR FROM THE SCUM AND MECHANICAL IMPURITIES CONTAINED THEREIN.

No. 294,798. Patented Mar. 11, 1884.

WITNESSES:

INVENTOR

ATTORNEY

UNITED STATES PATENT OFFICE.

S. MORRIS LILLIE, OF PHILADELPHIA, PENNSYLVANIA.

PROCESS OF AND APPARATUS FOR SEPARATING RAW SUGAR LIQUOR FROM THE SCUM AND MECHANICAL IMPURITIES CONTAINED THEREIN.

SPECIFICATION forming part of Letters Patent No. 294,798, dated March 11, 1884.

Application filed October 6, 1882. (No model.)

*To all whom it may concern:*

Be it known that I, S. MORRIS LILLIE, a citizen of the United States, residing at Philadelphia, in the county of Philadelphia and State of Pennsylvania, have invented a new and useful Process of Separating from a Raw Sugar Liquor its Mechanical Impurities, and have also invented suitable apparatus for carrying on the same, of which (the said process and apparatus) the following is a specification.

My process and apparatus relate to the separation from the raw sugar liquors of a sugar-refinery of the mechanical impurities contained in the same, this separation of the mechanical impurities being preparatory, in the process of sugar-refining, to running the liquor over the bone-black, and is now generally effected by means of the "bag-filters."

My process consists in first defecating the raw liquor with blood or an equivalent, in any suitable apparatus and manner, whereby the suspended matters are collected in a coagulum specifically lighter than the liquor, and then in running the liquor containing the coagulated albumen, &c., into a suitably-constructed drum rapidly revolving on or around a vertical axis, in which, owing to the centrifugal force, the liquor and its contents are separated, according to their specific gravities, into concentric cylindrical layers, the matters specifically lighter than the liquor, as the coagulated albumen, gathering into and forming the layer nearest the axis of the machine, the liquor, comparatively free of suspended matters, forming the cylindrical layer next removed from the axis, while all matters—such as sand, for example—specifically heavier than the liquor form a layer resting against the periphery of the drum; and my process consists, further, in removing from the drum this liquor, collected in the middle layer, by itself or separately from the scum forming the inner annular layer, and from the heavier matters resting on the periphery of the drum, and thus comparatively free of suspended matters. This separate drawing off of the clear liquor may be accomplished in several ways, as hereinafter described.

Figure 1:
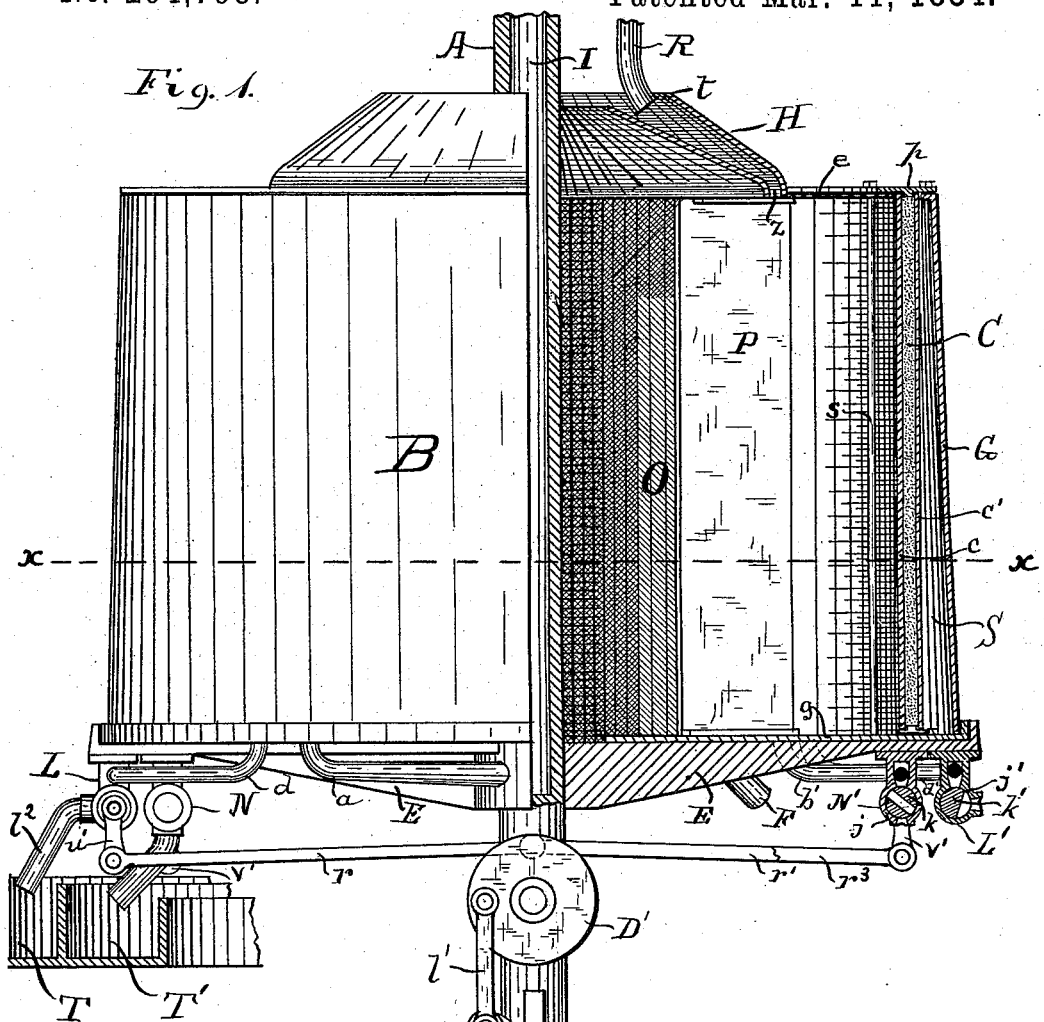
Figure 2:
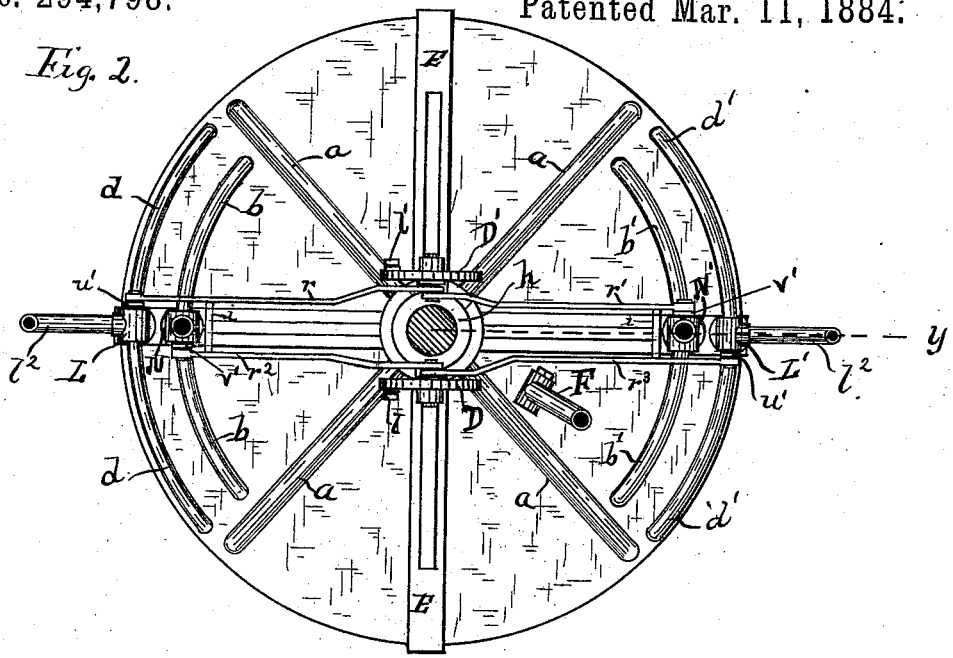

In the drawings is illustrated a centrifugal apparatus suitable for use in carrying on my process, Figure 1 being one-half—viz., that on the left—an elevation of the machine, and one-half a vertical section of the same through its axis; Fig. 2, a view of the under side of the drum of the machine; and Fig. 3, a horizontal section through the drum along the line $x\, x$, Fig. 1, Fig. 4 being a view of a modification.

Figure 3:
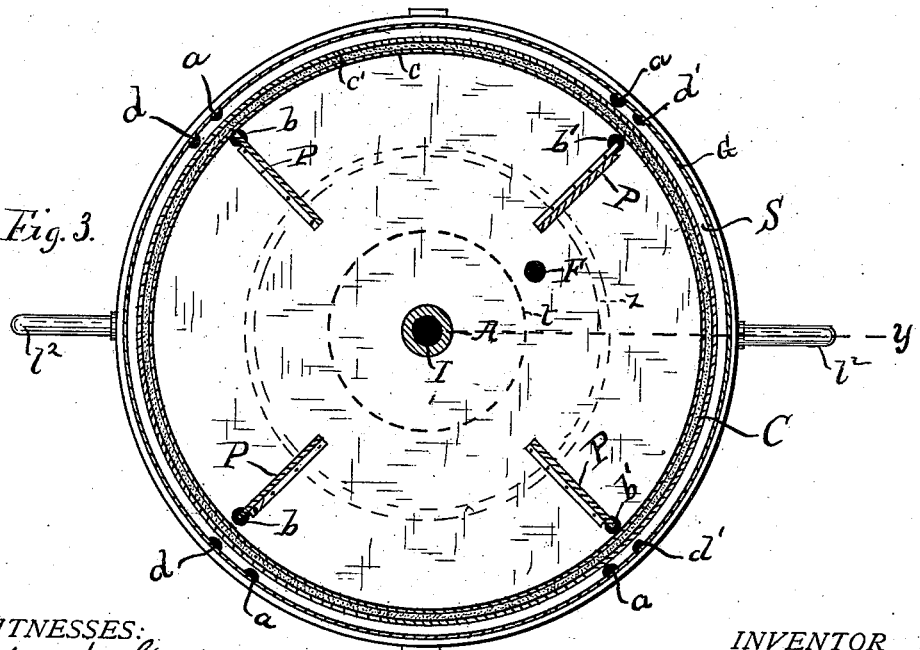

In Fig. 1—of which the half in section is a section of the machine along the line $y$, Figs. 2 and 3—A is the vertical axle of the machine, upon which the drum B is supported in a suitable manner, as by the radiating arms E. The axle is supported above and below in suitable bearings, (not shown,) and is tubular through its upper portion, which tubulated section communicates through the upper bearing with a main, which may be put in communication with a supply of water or other liquid, and also communicates with the drum of the machine, as described further on in this specification.

The drum B consists of a peripheric shell, G, slightly inclined outward from the top toward the bottom, a bottom plate, $g$, which extends from the axle A to the shell G, and is closed above—with the exception of an annular opening around the axle—by the annular hopper H, annular plate $e$, and cap $p$. The hopper H opens into the drum through an annular passage, $z$. Near its periphery the drum has a vertical annular filtering-wall concentric with the axle and with the shell G. It extends from the plate $g$ below to the cap $p$ above, which bears tightly against the upper edge of the filtering-wall, which thus divides the interior of the drum into the annular chamber S between it and the shell G, and the basket O between it and the axle.

The filtering-wall consists of the two concentric perforated plates $c\, c'$, between which is held the filtering medium C, and may be entirely removed from the drum, after removing the annular cap $p$, which—when held firmly in place by bolts passing through it and the plate $e$ on the one side, and through the flange on the upper edge of the shell G on the other side of the filtering-wall—presses the plates $c$ and $c'$ firmly against the bottom of the drum. The bottom plate, $g$, and the top plate, $e$, are firmly tied together, so that they may resist the pressure of any liquid there may be in the drum at any time while it is revolving by means of the radial plates P, whose upper and lower edges are provided with suitable flanges, which are respectively bolted to the plates $e$ and $g$. These radial plates extend from close to the filtering-wall some distance toward the axle of the drum, and serve, in addition to the purpose above set forth, to insure that any liquid contained in the revolving drum shall revolve as rapidly as the drum itself—i. e., prevents, so to speak, any slipping of the liquid on the surfaces of the interior of the drum. The plates $e$ and $g$ may be further held together by tie-rods. One such rod is shown at $s$, Fig. 1.

The chamber S has four eduction-pipes, $d\ d\ d'\ d'$, of which the pipes $d\ d$ discharge through the cock L, fastened to the under side of the drum, and sufficiently far from the axle to permit the liquid contents of the annular chamber S being completely discharged from the same while the machine is in motion, provided the cock L is open, and in a similar manner the pipes $d'\ d'$ discharge through a cock, L', similar to the cock L, and similarly located on the other side of the axle A, diametrically opposite to the cock L. The annular chamber S communicates with the axial passage I through the tubes $a\ a$, &c. The basket O has likewise four eduction-pipes, $b\ b\ b'\ b'$, which open into the basket near the filtering-wall C, and at points ninety degrees apart. The pipes $b\ b$ discharge through the common faucet N, and the pipes $b'\ b'$ through the common faucet N', the faucets N N' being supported on the under side of the drum, just back of the faucets L L', respectively, and on the same diameter with them. Nearer the axle the basket has still another discharging-place through the large cock F, which opens into the basket through the bottom of the drum at a point nearer to the axle than the annular passage $z$, through which the hopper H communicates with the interior of the basket.

The cocks L L' and the cocks N N' may at will be opened or closed in pairs, while the drum is revolving, by means of the following-described apparatus:

Supported vertically on two pins which project horizontally from opposite sides of a hub, $h$, (fixed on the axle below the drum,) and in a direction perpendicular to the diameter on which are the four cocks L L' N N', are the two disks D D', connected, respectively, by the links $l\ l'$ with a collar, J, keyed upon the axle below the disks, but capable of a vertical motion on the axle.

The collar J may be moved up or down the axle, as desired, by means of a pivoted lever, M, one arm of which is attached to a band, $o$, which encircles and is sunk into the collar J, and within which the collar revolves. On raising the free end of the lever M, the collar J is lowered, and on depressing the free end of the lever the collar is raised, and the disks D D' are revolved in one direction or in the other, as the case may be. The disk D is connected with the operating-levers of the cocks N and L' (see Fig. 2) by means of the connecting-rods $r^2\ r^3$, and the disk D' with the levers of the cocks L and N' by means of the connecting-rods $r\ r'$, so that when the disks are revolved by means of the lever M and intermediate mechanism they in turn move the levers of the four cocks to close them or to open them in pairs, (more or less,) as presently to be set forth.

The connecting-rods $r$ and $r^2$ are bound together to form one compound rod by means of one or more tie-rods, $i$, and the connecting-rods $r'\ r^3$ are also bound together in the same manner, the elements of each compound rod being so proportioned and of such weight that the masses of the two compound rods are equal to each other, and have their centers of gravity on the same diameter—viz., that on which the four cocks N L, &c., are located—and at equal distances from the center, the result being that the effect of the centrifugal force due to the revolution of the machine on the system, consisting of the rods $r'\ r^3$ and the levers of the cocks L' N' on one side of the axle, is exactly counterbalanced by the effect of the same on the corresponding system, consisting of the rods $r\ r^2$ and the levers of the cocks L N on the other side of the axle, so that in operating the four cocks by means of the lever M and the intermediate connecting parts it is only the friction of the parts that has to be overcome, and not at all the effect of the centrifugal force on any of these parts.

The arrangement of the plugs of the four cocks L L' N N' with respect to the levers of the cocks is such that when the levers of the four cocks stand vertical—which is always the case when the collar J is in its middle position—the cocks are all closed. When the levers are all moved to the right, by depressing the free end of the lever M, the cocks L L' are opened, while the cocks N N' remain closed; and when the levers are moved to the left, by raising the free end of the lever M, the cocks N N' are opened and the cocks L L' remain closed. This is made apparent by the sections of the cocks N' and L' shown on the right of Fig. 1. In Fig. 1 the levers of the cocks are in the vertical position and the collar J in its middle position. If, now, the levers of the cocks are moved toward the right, by depressing the free end of the lever M, the cock N', and also the cock N, whose construction is similar to that of the cock N', will remain closed, while the cock L', and also the cock L— which is quite similar to the one L', only differing from it in that its plug operates to open and close the side port, which opens into the discharge tube or nozzle $l^2$, instead of the upper port, as in the case of the cock L'—will be opened, and to a greater or less degree, depending upon the extent to which the levers of the cocks are moved toward the right. By returning the levers to the vertical position the cocks will be all closed again, and by further lifting the free end of the lever M, which will throw the levers of the four cocks to the left of the vertical, the cocks N N' will be opened to a greater or less degree, depending upon the extent to which the levers are moved toward the left, while the cocks L L' will remain closed. Thus it appears that while the machine is revolving, the cocks L L', which regulate the flow of any liquid from the annular chamber S, may be closed or opened, and, as regards the latter, to any degree, while the cocks N N' both remain closed; and, similarly, the cocks N N', which control the flow of matters from the basket O, may be closed or opened to any degree, while the cocks L L' remain closed, the changes being effected by means of the lever M and the intermediate mechanism connecting it with the levers of the cocks. The cock F might also be provided with means for operating it while the machine is in motion, similar to those used for operating the cocks of the centrifugal machine illustrated in Figs. 13 and 14 of Letters Patent No. 252,783, dated January 24, 1882, granted to me for improvements in sugar centrifugal machines. It would be as well, as regards both the working of this mechanism and the smooth working of the entire apparatus, to have a cock corresponding to the cock F on the other side of the axle from it, as thereby the drum would be more evenly balanced.

Having thus described my apparatus for freeing the defecated raw sugar liquor of its scum and of its other mechanical impurities by means of centrifugal force, I will now describe the several methods of using it in carrying on the process.

*First method.*—The filtering-wall C having first been removed from the drum and the annular cap *p* replaced, and the cocks F, N, N', L, and L' all being closed, the defecated liquor, having its coagulated albumen and mechanical impurities in suspension, is run into the drum through the annular hopper H, while the drum is revolving, until the drum is filled with the raw liquor nearly as far back as the upper edge *t* of the hopper. The liquor, owing to the centrifugal force due to the revolution of the machine, will rise upon the face of the plate G, and form an annular wall, more or less thick, depending upon the amount of liquor. In a short time, which will vary with the velocity of the revolutions of the machine, the contents of the drum will be separated into three cylindrical layers, the one nearest the axis being composed of the scum and all matters specifically lighter than the raw liquor. The layer next removed from the axis will consist of the raw liquor comparatively or quite free of suspended impurities; and, finally, against the shell G will rest a layer of matters specifically heavier than the liquor—as sand, for example. The separation of the liquor into these three concentric layers having taken place, the cocks N N', or, if there is no deposit of heavy matters on the face of the shell G, the cocks L L' instead, are opened more or less wide, and the clear liquor is drawn off from the machine, after which the scum may be drawn off also, and be deprived of its "sweetness" by washing in a suitable apparatus; or, the clear liquor having been all drawn off, the scum may be washed in the machine, after closing the cocks N N' or L L', by running a quantity of water into the drum, either through the hopper H or through the axial passage I and branch tubes *a a*, &c., and allowing a separation of the scum from the resulting sweet water by the centrifugal force, and then drawing off the clear sweet water by means of the cocks N or L. This operation may be repeated until the scum is sufficiently washed, or until the sweet water resulting upon running water into the drum is of such density that the scum will not separate from it, either by rising toward the center or by settling against the shell G. The scum thus having been washed in the machine to the degree found advantageous, the scum is washed from the drum through the faucets L or N, after which the faucets are closed and another charge of the raw liquor is run in without any stoppage of the machine; and thus the operations are repeated until all of the raw liquor has been separated from its scum and mechanical impurities without the necessity of once stopping the machine. Should the liquor separated in this manner not be perfectly or sufficiently bright and clear, it may be passed through suitable filtering apparatus to free it of the suspended impurities remaining in it.

*Second method.*—The filtering medium C and plates *c c'* having been removed from the drum, the drum is charged with the raw liquor until it nearly reaches the cock F. After a separation of the charge has been effected by the centrifugal force into the three concentric layers of scum, clear liquor, and heavy matters, respectively, as in the first method, the cocks N N' are opened the proper degree by depressing the free end of the lever M, and the clear liquor is allowed to flow slowly from the drum continuously, while raw liquor is allowed to flow at the same rate into the drum from the liquor-main R, and the accumulating scum to flow from the cock F continuously, also, the cock F having been opened before starting the machine, or afterward for that matter, if provided with the necessary operating mechanism. In following this method care must be taken not to have the flow of the liquor from the faucets N rapid enough to draw the liquor from the drum more rapidly than it can be freed of its scum by the centrifugal force. The separation of the scum thus continues without stoppage until the last of the raw liquor to be treated has been run in, and then the process is finished according to the first method. The scum separated by this second method of working must be washed in another apparatus for the removal of its sweetness from it.

*Third method.*—This method requires the presence of the filtering medium C and its containing-plates c c' in the drum, and in commencing it is better to first charge the basket O of the machine with a quantity of filtered liquor free from mechanical impurities, so that when the raw liquor is run into the revolving machine its scum may not come in contact with and smear and clog the filtering medium C. The revolving machine having been thus charged with the filtered liquor, and the discharge-cocks of the drum being closed, including the cock F, the cocks L L' are opened to the proper degree, and simultaneously the raw liquor is allowed to flow into the machine from the liquor-main R. As in the other methods, the liquor is separated from the scum by the centrifugal force; but, unlike the other methods, in this the separated liquor flows through the filtering-wall C, on which are collected all of the mechanical impurities not embraced in the scum which floats upon the inner surface of the liquor, and, as a consequence, the liquor flows from the drum through the cocks L and L', filtered and perfectly free of all suspended impurities. The raw liquor is run continuously into the machine through the hopper as fast as the liquor flows from the cocks L L', which, however, must not be allowed to be fast enough to permit the scum to settle upon the surface of the filtering-wall C, by which the pores of the latter would be quickly clogged, and this will not occur if the cocks L L' are so regulated that the current of the liquor toward the filtering-wall is not so rapid as the rate at which the scum rises through the liquor toward the axle under the influence of the centrifugal force. This continuous separation and filtration of the raw liquor from its scum and mechanical impurities is kept up until the gradually-accumulating scum in the basket of the machine has gotten to be so great in quantity that it can no longer be kept back from the filtering-wall C, which will be indicated by a slackened flow of the filtered liquor from the cocks L L'. This point having been reached, the flow of the raw liquor into the basket of the machine is stopped, and the liquor is allowed to drain away from the scum as much as possible. This having been done, the cocks L L' are closed, and the scum, while still in the machine, is deprived of the liquor or sweetness still remaining in it by successive washings with hot water introduced into the basket of the machine either through the hopper H or through the axial passage I and branch tubes a a, &c., the sweet water resulting from each washing being drawn off through the filtering-wall C and cocks L L', and the cocks again closed before the introduction of the water for the next washing into the basket of the machine. The sweetness having been sufficiently removed from the scum, the latter is completely removed from the basket and the filtering medium C perfectly cleansed by closing the cocks L L' and opening the cocks N N' to the fullest extent, and then opening a water-connection with the axial passage I, and causing a strong flow of water through the same and the tubes a a a a into the annular chamber S, whence it will be forced backward through the filtering-wall C and out of the basket, through the cocks N N', by the centrifugal force acting on the columns of water, so to speak, in the tubes a a a a. In its passage through the filtering medium C, the water will thoroughly cleanse it throughout its entire extent, and in flowing from the basket will carry with it the scum collected therein during the preceding filtration process. The filtering medium and basket having been sufficiently cleansed, the water is shut off from the axial passage I, the water is all drawn off from the drum, and from the tubes a a, &c., and the axial passage I, and the apparatus is ready for the separation and filtration of another quantity of liquor. To the end that there may be less sweet water produced in washing the scum for the purpose of removing its sweetness, the washing may be done as follows: The liquor having been drained as completely as possible of liquor preparatory to washing the scum, the scum is first washed with the richest (in sugar) washings from a former batch of scum, and the washings resulting from this first treatment, being but a little less dense than the filtered raw liquor, are sent into the same tanks with it. The scum is then washed with some of the less rich washings from the former batch of scum, and the washings resulting from this treatment are reserved and used for the first washing of a future lot of scum, and thus the scum is washed successively with progressively poorer washings from a former batch or batches of scum, and finally with a little fresh water, the first and densest washings from the scum being sent into the receptacles for the filtered liquor, and the other washings being reserved for the washing of a future lot of scum, from which lot of scum the densest of these reserved washings will be sent into the filtered liquor, and thus the washings all find their way into the liquor at last, with the exception of the washings from the last lot of scum, which will be the only sweet water resulting from the cycle of work.

Figure 4:
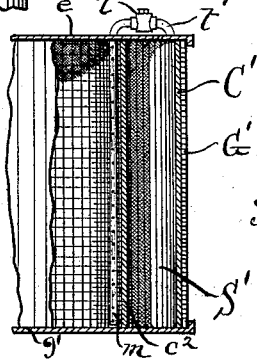

*Fourth method.*—In this method, also, the filtering-wall C is retained in the machine; but it differs from the third method in that the scum is not washed in the machine, but is allowed to run continuously from the basket through the cock F, and is washed in other apparatus. The filtered liquor is likewise drawn off continuously, at the proper rate, from the annular chamber S, through the cocks L, and the raw liquor is run continuously into the basket of the machine through the hopper H, and the continuity of the operation is not broken until all of the liquor to be treated has passed through the machine, or until the filtering medium C has become so clogged as to prevent the filtration of the liquor and necessitate the cleansing of it. For the best success in practicing this process of filtration by centrifugal force, it is necessary that the scum should not be permitted to reach the filtering medium, and this I accomplish in the apparatus hereinbefore described by means of the annular chamber S, which encircles the filtering-wall, and into which the liquor flows from the basket O on passing through the filtering medium C, and by means of the faucets L L', by which the flow of the filtered liquor from the chamber S may be limited to so slow a rate that the current of the liquor in the basket toward the filtering-wall will not be rapid enough to bring the scum down, so to speak, upon the latter. In Fig. 4 I have shown another arrangement adapted for the accomplishment of this same end—viz., to prevent a too rapid flow of the liquor in the basket toward the filtering medium, and the consequent clogging of the latter by the scum which would be brought to it by the too rapidly-moving liquor. In Fig. 4 is shown a portion of a vertical axial section of this machine extending but a part of the distance from the periphery toward the axle. In this, as in the ordinary form of centrifugal draining-machines, the filtering medium C' rests against a perforated plate, G', which forms the periphery of the basket, of which $e'$ and $g'$ are the top and bottom plates, respectively. A concentric circular partition, $c^2$, divides the interior of the basket into two parts—viz., the radially narrow outer chamber, S', between the partition and the filtering medium C', and a much larger central chamber between the partition and the axle. The two chambers communicate with each other through one or more tubes, $t'$, each provided with a faucet, $f$, by which the flow of liquor from the inner compartment into the outer one may be regulated. The tubes enter the central chamber just in front of the partition $c^2$, and each has a vertical extension, $m$, therein, reaching nearly to the bottom plate, $g'$, and having a number of perforations distributed along its length, in order that the liquor flowing into the outer chamber may be drawn from the central chamber at all levels. By having these perforations limited as regards number and size, so that the liquor in the central chamber could not enter the tubes and flow into the outer chamber too rapidly, the cocks $f$ might be dispensed with, and, similarly, the tubes $t$ might also be dispensed with by having the partition $c^2$, pierced with perforations, limited in size and number, so that the flow of liquor from the inner into the outer compartment could never be rapid enough to bring the scum down to the partition as long as the raw liquor was being continuously run into the central chamber, as hereinbefore described in connection with the apparatus illustrated in the other figures of the drawings.

The use of the machine, a part of which is shown in Fig. 4, may be in accordance with either the third or the fourth methods hereinbefore described, with the exception that the scum cannot be removed from the machine, nor the filtering medium cleansed, while the machine is in motion. I prefer the machine illustrated in Figs. 1 to 3, inclusive, and have shown and described the devices given in Fig. 4 simply as instances of the various means that may be employed to limit the flow of the liquor in the machine toward the periphery, so that while the process of separation and filtration is in progress the scum may not be brought down upon the filtering medium to clog it. The filtered liquor escapes from the machine shown in Fig. 4 into a suitable case surrounding it, (not shown,) in which the machine revolves.

The machine illustrated in Figs. 1 to 3, inclusive, may be modified in directions other than those indicated in Fig. 4. For example, the hopper H may be provided with one of the various kinds of sleeve-caps shown in the drawings of Patent No. 252,783, January 24, 1882, granted to me for improvements in sugar centrifugal machines; and, again, the hopper H may be dispensed with and the top plate, $e$, of the drum be extended quite to the axle by introducing the raw liquor into the basket via the tubular axle. To this end the axle A should be tubular both below and above, the lower passage communicating with the annular chamber S through radiating tubes $a$, and the upper passage communicating with the basket through radiating tubes or passages opening through the top plate, $e$, into the interior of the basket at points more or less distant from the axle. The upper tubular passage in the axle and its radiating-tubes would serve for introducing the raw liquor into the basket of the machine, while the lower axial passage and radial tubes would answer for leading water or other liquid to the annular chamber S.

It is to be noticed that while in my process the liquor is separated from the specifically lighter scum and from the specifically heavier sand, &c., the scum is also separated from the heavier sand; and it is evident that, similarly, two materials or substances having different specific gravities may be separated from each other, if mixed together, by mixing them with a liquid having a specific gravity between the two, and subjecting the fluid mixture to the action of centrifugal force in a suitable rapidly-revolving drum, as hereinbefore described.

Thus having described my process and apparatus for carrying it on, I claim as of my invention—

1. The within-described process of separating a liquid from its mechanical impurities specifically lighter and specifically heavier than itself, consisting in subjecting the impure liquid to the action of centrifugal force in a rapidly-revolving drum, and in drawing off from the revolving drum by itself the liquid separated from its mechanical impurities by the centrifugal force, substantially as specified.

2. The within-described process of separating a liquid from its mechanical impurities specifically lighter and specifically heavier than itself, consisting in running the impure liquid continuously into a suitable rapidly-revolving drum, and in drawing off, respectively, from the concentric layers of the specifically lighter impurities, and the comparatively clear liquid formed in the drum by the centrifugal force, the said lighter impurities and the clear liquid as fast as the separation progresses, substantially as specified.

3. The combination, with the drum of a centrifugal machine, of two series of discharging-spouts, one series draining the drum near the axle, and the other near its circumference, means for introducing a liquid continuously into the drum between the two series of spouts, while the machine is in motion, and means for introducing a liquid continuously into the drum, while in motion, between the circumference of the same and the outer series of draining-spouts, substantially as specified.

4. The combination, with the drum of a centrifugal machine, of one or more discharging-spouts, draining the drum through ports near the axle, means for introducing a liquid into the drum, while in motion, between the ports of the discharging-spouts and the circumference, and means for introducing a liquid continuously into the drum, while in motion, still nearer to or at the circumference of the drum, substantially as specified.

5. The combination, with the drum of a centrifugal machine, of two series of discharging-spouts attached to the drum and revolving with it, one series draining the drum at points near the circumference, and the other series draining it at points near the axle, means for introducing the liquid to be treated into the drum, while revolving, between the two series of spouts or the openings of the same into the drum, and apparatus for regulating, while the machine is in motion, the flow of material from the outer or from both series of spouts independently of the flow of the liquid into the drum, substantially as specified.

6. The combination, in the drum of a centrifugal machine, of the annular wall C, permeable to liquids, surrounding annular chamber S, inner chamber, O, a series of discharging-spouts, F, for the said inner chamber, opening into it near the axle, means for introducing a liquid continuously into the inner chamber between the openings of the discharging-spouts into the same, and the annular permeable wall C, and means for introducing a liquid continuously into the chamber S while the machine is in motion, substantially as specified.

7. The combination, in the drum of a centrifugal machine, of an annular wall, C, permeable to liquids, surrounding annular chamber S, inner chamber, O, two series of discharging-spouts for the said inner chamber, one series draining the chamber at points near the axle, as at F, and the other series draining it at points near the annular permeable wall C, as at N, means for introducing a liquid continuously into the drum at a distance from the axle between the two series of discharging-spouts while the machine is in motion, and means for introducing a liquid continuously into the annular chamber S while the machine is in motion, substantially as specified.

8. The combination, with the drum of a centrifugal machine, of an annular wall, C, permeable to liquids, and dividing the interior of the drum into two chambers, the outer annular chamber, S, and the inner chamber, O, two series of discharging-spouts for the inner chamber, one series draining it at points near the axle, and the other draining it at points near the permeable wall C, means for introducing a liquid continuously into the outer chamber, S, while the machine is in motion, and apparatus for regulating the flow of material from one or from both series of spouts, substantially as specified.

9. The combination, in the drum of a centrifugal machine, of the annular filtering-wall C, outer chamber, S, inner chamber, O, spouts F, for draining the inner chamber, spouts for draining the outer chamber, S, means for introducing a liquid continuously into the inner chamber, O, between the spouts F and the filtering-wall, and apparatus for regulating, while the machine is in motion, the flow of material through the draining-spouts of the outer chamber, substantially as specified.

10. The combination, in the drum of a centrifugal machine, of an annular filtering-wall, spouts for draining the drum at points located within the annular filtering-wall and near the axle, means for introducing a liquid continuously into the drum between the said spouts and the filtering-wall, and means for regulating the flow of the liquid through the filtering-wall, substantially as specified.

11. The combination, in the drum of a centrifugal machine, of the filtering-wall C, inner chamber, O, and discharging-spouts F, for draining the same from points near the axle, outer chamber, S, and discharging-spouts L for the same, and annular hopper H, delivering into the drum between the spouts F and filtering-wall C, substantially as specified.

12. The combination, in a centrifugal machine, and with the drum of the same, of the annular filtering-wall C, inner chamber, O, and discharge-cocks F and N for the same, outer chamber, S, and discharge-cocks L, axial conduit I, communicating with the chamber S through the radiating tubes a, and annular hopper H, communicating with the inner chamber, O, between the discharge-cocks F and the filtering-wall C, substantially as specified.

13. In the drum of a centrifugal machine, the combination, with an annular chamber, S, encircling the annular filtering-wall of the drum, of the discharging cocks or valves L and the radiating tubes $a$, independent of the cocks or valves L, communicating with an axial conduit, substantially as specified.

14. The within-described mechanism for operating the valves or cocks in the discharging-spouts of the drum of a centrifugal machine, consisting of the pivoted lever M, collar J, links $l$, and disks D, or their equivalents, and the rods $r$, connecting the disks with the operating-levers of the cocks or valves, the combination operating substantially as specified.

15. In a centrifugal machine, a system of mechanism for operating the cocks or valves of the discharging-spouts of the drum—the said mechanism forming a part of the machine and revolving with it—arranged, as regards the mass and disposition of the elements of the system, so that the effects of the centrifugal force, due to the revolution of the machine, on the various elements will neutralize each other, in combination with means for operating the system while the machine is revolving, substantially as specified.

16. The within-described process of separating from a raw sugar liquor its mechanical or suspended impurities, consisting in first defecating the raw liquor with blood or its equivalent, and in then freeing the liquor of the resulting coagulum and the specifically heavier mechanical impurities by subjecting it to the action of centrifugal force in a suitable rapidly-revolving drum, and drawing off from the revolving drum by itself the clear or comparatively clear liquor, separated from the scum and from the other mechanical impurities, substantially as specified.

S. MORRIS LILLIE.

In presence of—
THOMAS L. KELLY,
ACMILIUS M. STOUT.